(12) United States Patent
Couilleaux et al.

(10) Patent No.: US 11,846,250 B2
(45) Date of Patent: Dec. 19, 2023

(54) RETRACTABLE AIR-OIL HEAT EXCHANGER FOR AIRCRAFT PROPULSION ASSEMBLY

(71) Applicant: SAFRAN AIRCRAFT ENGINES, Paris (FR)

(72) Inventors: Alexandre Gérard François Couilleaux, Moissy-Cramayel (FR); Mathieu Lasne, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/907,587

(22) PCT Filed: Mar. 19, 2021

(86) PCT No.: PCT/FR2021/050459
§ 371 (c)(1),
(2) Date: Sep. 28, 2022

(87) PCT Pub. No.: WO2021/198581
PCT Pub. Date: Oct. 7, 2021

(65) Prior Publication Data
US 2023/0151778 A1 May 18, 2023

(30) Foreign Application Priority Data

Mar. 30, 2020 (FR) ...................... 2003148

(51) Int. Cl.
*F02K 3/115* (2006.01)
*F28F 27/00* (2006.01)
*F02C 7/18* (2006.01)

(52) U.S. Cl.
CPC ........ *F02K 3/115* (2013.01); *F05D 2220/323* (2013.01); *F05D 2260/213* (2013.01)

(58) Field of Classification Search
CPC .............. F02K 3/115; F28F 27/00; F02C 7/18
See application file for complete search history.

(56) References Cited

U.S. PATENT DOCUMENTS

| 2,249,948 | A | 7/1941 | Dornier |
| 7,861,512 | B2* | 1/2011 | Olver ...................... F02C 7/141 |
| | | | 60/39.08 |
| 8,127,828 | B2* | 3/2012 | Schwarz ................. F01D 25/24 |
| | | | 165/44 |
| 8,534,043 | B2 | 9/2013 | Schwarz et al. |

(Continued)

FOREIGN PATENT DOCUMENTS

| EP | 2336525 A1 | 6/2011 |
| EP | 3012443 A1 | 4/2016 |

OTHER PUBLICATIONS

International Search Report for issued in Application No. PCT/FR2021/050459 dated Jun. 15, 2021.

(Continued)

*Primary Examiner* — Long T Tran
(74) *Attorney, Agent, or Firm* — Pearne & Gordon LLP

(57) ABSTRACT

A turbofan aircraft propulsion assembly includes a retractable heat exchanger. The heat exchanger can be deployed in a secondary flow path of the propulsion assembly so as to cool a fluid circulating in a circuit of a transfer module of the heat exchanger using a secondary flow circulating in the secondary flow path.

8 Claims, 4 Drawing Sheets

(56) References Cited

U.S. PATENT DOCUMENTS

| | | | |
|---|---|---|---|
| 8,776,952 B2 | 7/2014 | Schwarz et al. | |
| 2008/0028763 A1 | 2/2008 | Schwarz et al. | |
| 2016/0326903 A1* | 11/2016 | Xu | F02C 9/18 |
| 2017/0044984 A1* | 2/2017 | Pesyna | F02K 3/115 |
| 2017/0159490 A1 | 6/2017 | Sennoun | |
| 2019/0218973 A1 | 7/2019 | Schwarz et al. | |
| 2020/0362759 A1* | 11/2020 | Roberge | F02K 3/115 |
| 2021/0222624 A1* | 7/2021 | Wiedenhoefer | F02K 3/105 |

OTHER PUBLICATIONS

Written Opinion for PCT/FR2021/050459 dated Jun. 15, 2021.
Search Report issued in French Patent Application No. 2003148 dated Nov. 17, 2020.

* cited by examiner

RETRACTABLE AIR-OIL HEAT EXCHANGER FOR AIRCRAFT PROPULSION ASSEMBLY

This is the National Stage of PCT international application PCT/FR2021/050459, filed on Mar. 19, 2021 entitled "RETRACTABLE AIR-OIL HEAT EXCHANGER FOR AIRCRAFT PROPULSION ASSEMBLY", which claims the priority of French Patent Application No. 2003148 filed Mar. 30, 2020, both of which are incorporated herein by reference in their entireties.

TECHNICAL FIELD

The invention relates to the field of turbofan aircraft propulsion assembly.

The invention relates more specifically to a heat exchanger intended to cool a hot fluid, such as oil circulating in a lubrication circuit of the propulsion assembly, with cold air of a secondary flow of the propulsion system.

STATE OF THE PRIOR ART

The document EP 2 336 525 A1 describes a heat exchanger of the air-oil type known under the name "ACOC", standing for "Air Cooled Oil Cooler". This heat exchanger extends radially in a secondary flow path of the propulsion assembly so as to be crossed by the secondary cold air flow and thus cool the oil used to lubricate parts of the engine of this propulsion assembly.

Such a heat exchanger forms an aerodynamic discontinuity in the secondary flow path, which leads to singular pressure drops in all phases of flight.

The document US 2017/0159490 A1 describes a heat exchanger housed in an internal nacelle structure which comprises a scoop system provided to route a fraction of the secondary flow to the heat exchanger.

Such a scoop system allows reducing the singular pressure drops in the take-off phase, but nevertheless generates significant singular pressure drops in the cruise phase.

DISCLOSURE OF THE INVENTION

The invention aims at providing a propulsion assembly nacelle having a heat exchanger capable of effectively cooling a fluid using the secondary flow while limiting the singular pressure drops.

To this end, the subject of the invention relates to a nacelle for a turbofan aircraft propulsion assembly, comprising an internal structure, an external structure and a heat exchanger, the internal structure and the external structure delimiting radially therebetween a conduit for flowing a first fluid intended to form a secondary flow, the heat exchanger comprising an outer cowl and a transfer module, the transfer module including a circuit for circulating a second fluid, the heat exchanger being connected to one of the internal structure and the external structure so as to be able to transmit heat from the second fluid to the first fluid.

According to the invention, this nacelle comprises an actuator configured to displace the outer cowl and the transfer module of the heat exchanger between:
  a retracted position in which the transfer module is received in a housing of the internal or external structure to which the heat exchanger is connected and in which the outer cowl seals an opening of this housing so as to reconstitute a delimiting surface of the flow conduit,
  a deployed position in which the transfer module extends into the flow conduit so as to be able to be crossed by a fraction of the secondary flow and thus transmit heat from the second fluid to first fluid.

Such a nacelle allows exposing the transfer module of the heat exchanger to the first fluid when there is a need for cooling the second fluid and only in this case.

When such cooling is not necessary, its retraction allows limiting or even cancelling the singular pressure drops that it is likely to generate. The reduction or cancellation of the singular pressure drops results, on the one hand, from the retraction as such of the heat exchanger and, on the other hand, from the geometry of the outer cowl since the latter is designed to reconstitute the delimiting surface of the flow conduit.

In other words, in the retracted position, the heat exchanger is arranged to avoid the creation of a form accident in the flow conduit likely to disturb the secondary flow circulating in this conduit.

The aerodynamic continuity of the flow conduit results more particularly from the fact that the outer cowl reconstitutes the delimiting surface of the flow conduit, that is to say from the fact that this outer cowl is flush with the portions of said delimiting surface which are adjacent to the portion of this surface which is constituted by the outer cowl itself. Such a configuration of the outer cowl allows in particular limiting or preventing the introduction of a portion of the first fluid into the housing of the transfer module.

This results in a significant reduction in the singular pressure drops and an overall improvement in the performance of the propulsion system in all phases of flight including the take-off and cruise phases.

Preferably, the actuator is configured to move the outer cowl and the transfer module of the heat exchanger between the retracted position and the deployed position by radial translation.

In one embodiment, the heat exchanger comprises an inner wall, the transfer module extending radially between the inner wall and the outer cowl, the inner wall of the heat exchanger being configured to seal said opening of the housing of the internal or external structure to which the heat exchanger is connected so as to reconstitute said delimiting surface of the flow conduit when the heat exchanger is in the deployed position.

The heat exchanger in the deployed position naturally introduces an aerodynamic discontinuity within the flow conduit since the outer cowl and the transfer module extend radially into the flow conduit.

However, the resulting singular pressure drops are reduced given the configuration of the inner wall which, in the same manner as the outer cowl in the deployed position, is flush with the adjacent portions of the delimiting surface and prevents or limits the introduction of a portion of the first fluid into the housing of the transfer module.

The geometry of the outer cowl and/or of the inner wall of the heat exchanger is preferably configured to define, with the internal or external structure to which the heat exchanger is connected, a delimiting surface of the flow conduit having a curvature, at least in a median longitudinal plane of the nacelle.

Thus, the outer cowl of the heat exchanger may comprise a surface having, in a median longitudinal plane, a single or double curvature.

Similarly, the inner wall of the heat exchanger may comprise a surface having, in a median longitudinal plane, a single or double curvature.

In one embodiment, the heat exchanger comprises a member for coupling the circuit for circulating the second fluid, this member being configured to couple this circulation circuit to a lubrication circuit of the propulsion assembly.

The nacelle preferably comprises a member for detecting and/or evaluating at least one parameter such as the temperature of the second fluid and a control module connected, on the one hand, to this member and, on the other hand, to the actuator so as to be able to displace the outer cowl and the transfer module depending on the at least one parameter.

In one embodiment, the outer cowl of the heat exchanger may comprise a cavity configured to circulate a portion of said second fluid in this outer cowl.

The presence, in the outer cowl, of such a cavity allows increasing the total heat exchange surface.

This cavity can for example be connected to said circuit of the transfer module to form therewith a common circuit.

Preferably, the cavity of the outer cowl can be configured to carry out a heat exchange between the first and second fluids when the heat exchanger is in the retracted position.

The invention also covers a propulsion assembly for an aircraft, this propulsion assembly comprising a nacelle as defined above, as well as an aircraft comprising such a propulsion assembly.

The invention also relates to a method for manufacturing a heat exchanger of a nacelle as defined above.

According to the invention, this method comprises a step of additive manufacturing of the outer cowl of the heat exchanger.

The additive manufacturing of the outer cowl allows optimising its geometry relative to the housing of the transfer module of the heat exchanger, so as to reduce the discontinuities between this outer cowl and the internal or external structure of the nacelle to which the heat exchanger is connected when the latter is in the retracted position.

Preferably, this method also comprises a step of additive manufacturing of the inner wall of the heat exchanger.

The additive manufacturing of the inner wall allows optimising its geometry relative to the opening of the housing of the transfer module of the heat exchanger, so as to reduce the discontinuities between this inner wall and the internal or external structure of the nacelle to which the heat exchanger is connected when the latter is in the deployed position.

Of course, the invention also covers a method for additive manufacturing of all or part of the heat exchanger, including for example a step of additive manufacturing of the outer cowl, the inner wall and the transfer module.

The invention also relates to a method for manufacturing a nacelle as defined above, implementing such a method for manufacturing a heat exchanger.

Other advantages and features of the invention will appear on reading the following detailed, non-limiting description.

BRIEF DESCRIPTION OF THE DRAWINGS

The following detailed description refers to the appended drawings in which.

DETAILED DESCRIPTION OF EMBODIMENTS

Figure 1:
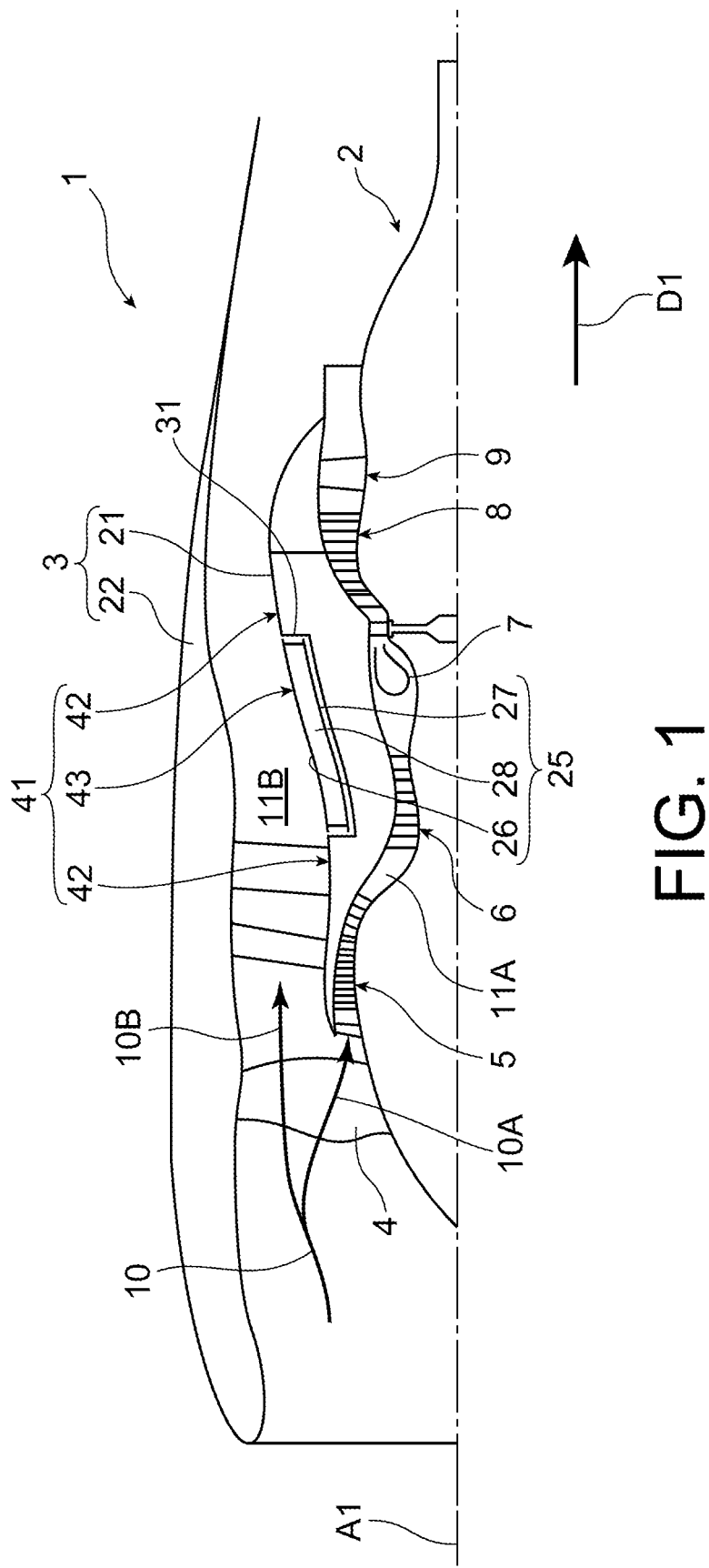
FIG. 1 is a schematic half-view in axial section of an aircraft propulsion assembly according to a first embodiment of the invention, comprising a heat exchanger connected to an internal structure of the propulsion assembly, the heat exchanger being in the retracted position.

There is represented in FIG. 1, an aircraft propulsion unit 1 comprising a turbine engine 2 ducted by a nacelle 3. In this example, the turbine engine 2 is a turbofan and twin-spool turbojet engine.

Subsequently, the terms "upstream" and "downstream" are defined relative to a direction D1 of gas flow through the propulsion assembly 1 when the latter is propelled.

The turbojet engine 2 has a longitudinal central axis A1 about which the different components thereof extend, in this case, from upstream to downstream, a fan 4, a low pressure compressor 5, a high pressure compressor 6, a combustion chamber 7, a high pressure turbine 8 and a low pressure turbine 9. The compressors 5 and 6, the combustion chamber 7 and the turbines 8 and 9 form a gas generator.

During the operation of the turbojet engine 2, an air flow 10 enters the propulsion assembly 1 via an air inlet upstream of the nacelle 3 and passes through the fan 4. Downstream of the fan 4, a portion of this air flow 10 penetrates within the gas generator, in a space 11A called "primary flow path", so as to form a primary flow 10A passing through the gas generator. Another portion of the airflow 10 continues its trajectory in a conduit 11B surrounding the gas generator so as to form a secondary flow 10B. The conduit 11B is called "secondary flow path".

The nacelle 3 more specifically comprises an internal structure 21 forming an internal fairing of the gas generator and an external structure 22 forming an external fairing of the propulsion assembly 1. The internal structure 21 and the external structure 22 of the nacelle 3 delimit radially therebetween said secondary flow path 11B.

Such an architecture thus allows generating a dual flow comprising, on the one hand, the primary flow 10A reaching a relatively high temperature in the primary flow path 11A and, on the other hand, the secondary flow 10B whose temperature remains relatively low within the secondary flow path 11B.

In a manner known per se, the turbojet engine 2 comprises a lubrication circuit (not represented) in which a fluid such as oil is circulated in order to cool and/or lubricate mechanical components (not represented) of the turbojet engine 2.

The invention relates more specifically to a heat exchanger 25 allowing, in this example, cooling the oil circulating in the lubrication circuit.

Figure 2:
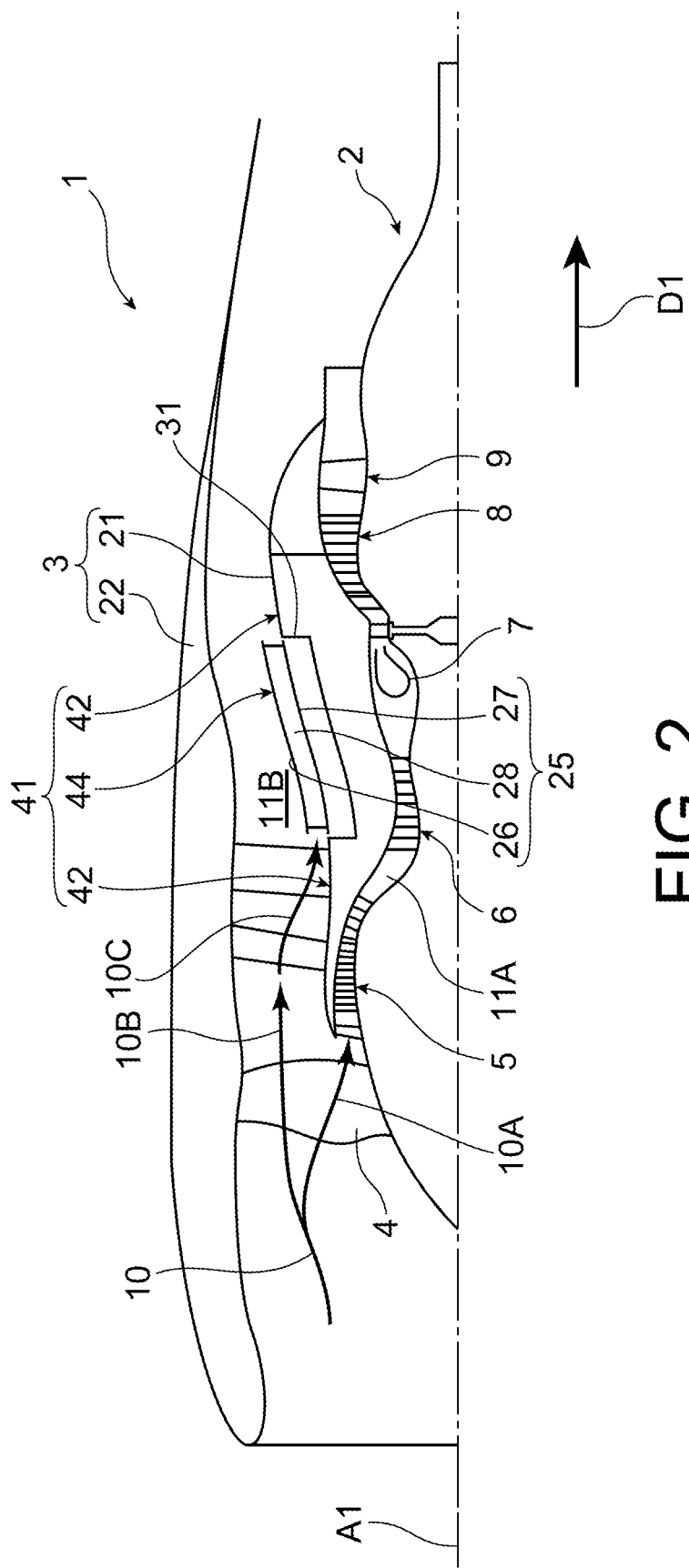
FIG. 2 is a schematic half-view in axial section of the propulsion assembly of FIG. 1, the heat exchanger being in the deployed position.

Unless otherwise indicated, the following description relates to the embodiment of FIGS. 1 and 2.

The heat exchanger 25 is configured to be able to be placed in a retracted position, illustrated in FIG. 1, or in an extended position, illustrated in FIG. 2.

In general, the heat exchanger 25 comprises an outer cowl 26, an inner wall 27 and a transfer module 28 extending radially between the outer cowl 26 and the inner wall 27.

In this example, the outer cowl 26 and the inner wall 27 each form a solid structure having a continuous surface.

The transfer module 28 comprises a circulation circuit (not represented) to which the lubrication circuit of the turbojet engine 2 is connected such that the cooling and/or lubricating oil, more generally forming a heat transfer fluid, circulates in the circuit of the transfer module 28.

The connection of the circulation circuit to the lubrication circuit is in this example made by a coupling member (not represented) comprising flexible pipes.

Figure 3:
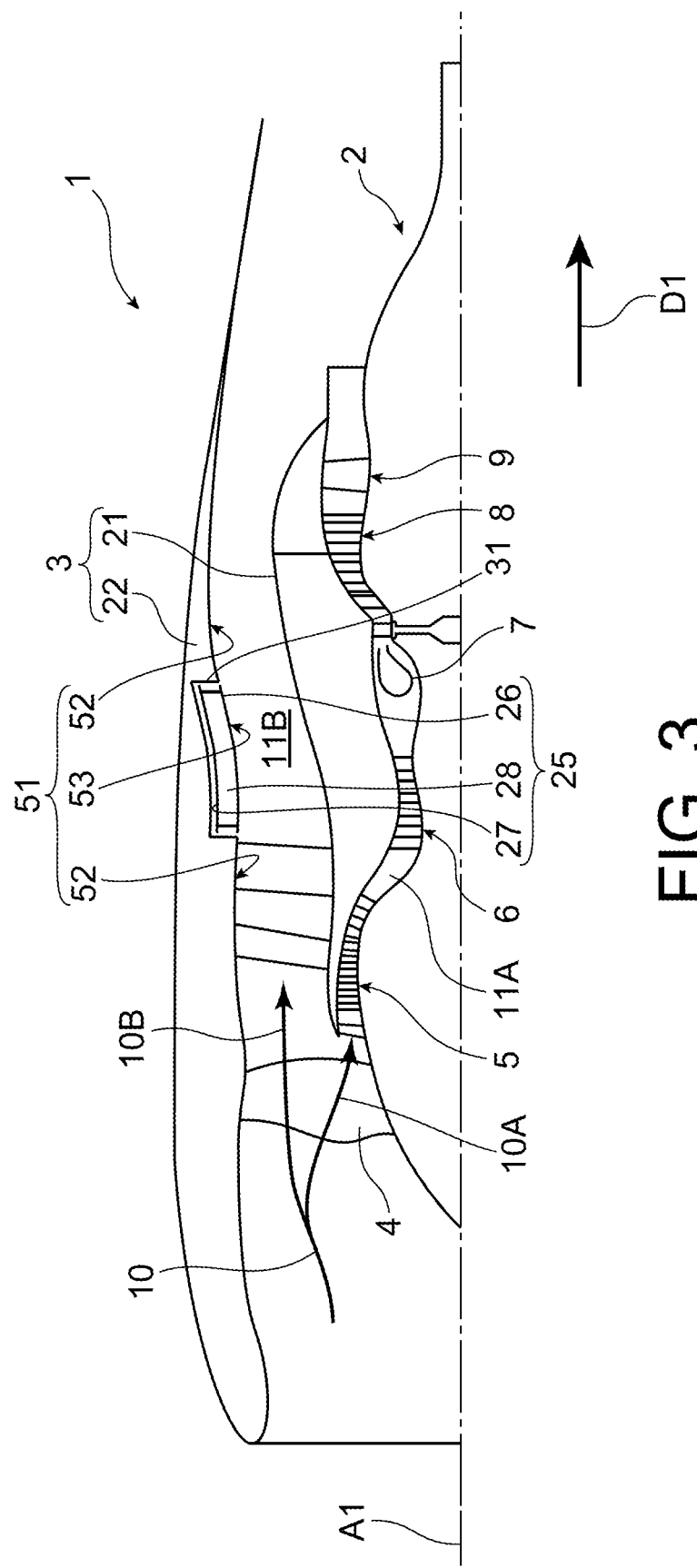
FIG. 3 is a schematic half-view in axial section of an aircraft propulsion assembly in accordance with a second embodiment of the invention, comprising a heat exchanger connected to an external structure of the propulsion assembly, the heat exchanger being in the retracted position.
Figure 4:
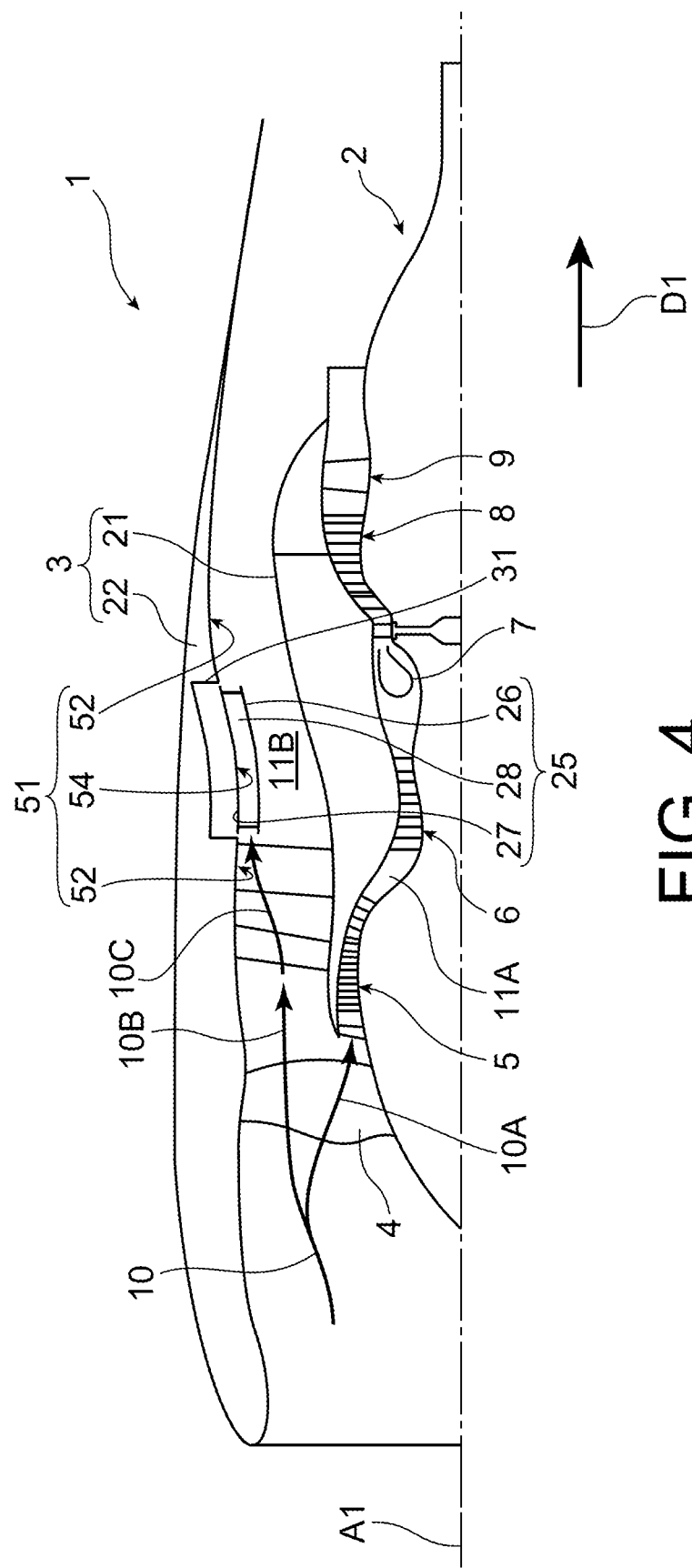
FIG. 4 is a schematic half-view in axial section of the propulsion assembly of FIG. 3, the heat exchanger being in the deployed position.

In this example, the heat exchanger 25 is connected to the internal structure 21 of the nacelle 3. In the embodiment of FIGS. 3 and 4, the heat exchanger 25 is connected to the external structure 22.

The propulsion assembly 1 comprises an actuator (not represented) such as a cylinder configured to move the heat exchanger from the retracted position (FIG. 1) to the deployed position (FIG. 2) and vice versa.

The internal structure 21 comprises a housing 31 having an opening which is opening into the secondary flow path 11B.

In the retracted position of FIG. 1, the transfer module 28 is received in the housing 31 of the internal structure 21 and the outer cowl 26 seals the opening of the housing 31, thus preventing or limiting an introduction of portion of the secondary flow 10B within the housing 31.

In the retracted position, the outer cowl 26 of the heat exchanger 25 reconstitutes a radially internal delimiting surface 41 of the secondary flow path 11B. Under these conditions, the delimiting surface 41 is formed by an external surface 42 of the internal structure 21 of the nacelle 3 and by an external surface 43 of the outer cowl 26 of the heat exchanger 25.

In the retracted position, the external surface 42 of the internal structure 21 of the nacelle 3 and the external surface 43 of the outer cowl 26 are flush.

The heat exchanger 25 in the retracted position therefore allows defining a relatively smooth secondary flow path 11B, tending to produce no singular pressure drop.

In the deployed position of FIG. 2, the outer cowl 26 as well as the transfer module 28 of the heat exchanger 25 extend into the secondary flow path 11B such that the transfer module 28 can be crossed by a fraction 10C of the flow secondary 10B.

The inner wall 27 of the heat exchanger 25 in the deployed position seals the opening of the housing 31, preventing or limiting the introduction of a portion of the secondary flow 10B within the housing 31.

This position allows carrying out a heat exchange between the secondary flow 10B and the heat transfer fluid circulating in the circuit of the transfer module 28, which allows cooling this heat transfer fluid.

The heat exchanger 25 in the deployed position performs the function of a conventional air-liquid exchanger, or ACOC exchanger.

In this example, in the deployed position (FIG. 2), the inner wall 27 of the heat exchanger 25 reconstitutes said radially internal delimiting surface 41 of the secondary flow path 11B. Under these conditions, the delimiting surface 41 is formed by the external surface 42 of the internal structure 21 of the nacelle 3 and by an internal surface 44 of the inner wall 27 of the heat exchanger 25.

The external surface 42 of the internal structure 21 of the nacelle 3 and the internal structure 44 of the inner wall 27 are flush, thus reducing the singular pressure drops when the heat exchanger 25 is in the deployed position.

In this example, the outer cowl 26, the inner wall 27 and the transfer module 28 form movable portions which are secured to each other and displaced as a unit when the position of the heat exchanger 25 changes.

In this regard, the flexible pipes of the coupling member allow preserving a sealed connection between the circulation and lubrication circuits.

The trajectory of the displacement of the movable portions of the heat exchanger 25 is in this example linear and consists of a radial translation. In other embodiments which are not represented, this trajectory may be curved and/or comprise one or more phases including a radial translation and/or an axial translation and/or a combination of axial and radial translations.

In this example, the propulsion assembly 1 also comprises a member (not represented) for detecting the temperature of the heat transfer fluid circulating in the lubrication circuit as well as a control module (not represented) connected, on the one hand, to this detection member and, on the other hand, to the actuator so as to modify the position of the heat exchanger 25 according to this temperature.

Typically, if the temperature exceeds a predetermined threshold, the heat exchanger 25 is placed or maintained in the deployed position and it is placed or maintained in the retracted position in the opposite case.

Other parameters can be used to control the position of the heat exchanger 25, for example a parameter representative of the flight phase or even a flow rate of the secondary flow 10B.

In this example, the outer cowl 26 and the inner wall 27 of the heat exchanger 25 each have a double curvature, in a median longitudinal plane passing through the heat exchanger 25.

The geometry of the outer cowl 26 and the inner wall 27 of the heat exchanger 25 can have any other geometry depending, for example, on the axial position at which the heat exchanger 25 is placed relative to the other portions of the nacelle 3.

The outer cowl 26 and the inner wall 27 of the heat exchanger 25 are in this example produced by additive manufacturing, which allows optimising their geometry and reducing the singular pressure drops.

The foregoing description applies by analogy to the embodiment of FIGS. 3 and 4.

Unlike the example of FIGS. 1 and 2, the outer cowl 26 of the heat exchanger 25, when the latter is in the retracted position, or the inner wall 27 thereof when it is in the deployed position, reconstitutes a radially external delimiting surface 51 of the secondary flow path 11B.

In the retracted position (FIG. 3), this delimiting surface 51 is formed by an internal surface 52 of the external structure 22 of the nacelle 3 and by an internal surface 53 of the outer cowl 26 of the heat exchanger 25.

In the deployed position (FIG. 4), this delimiting surface 51 is formed by the internal surface 52 of the external structure 22 of the nacelle 3 and by an internal surface 54 of the inner wall 27 of the heat exchanger 25.

What is claimed is:

1. A nacelle for a turbofan aircraft propulsion assembly, comprising an internal structure, an external structure and a heat exchanger, the internal structure and the external structure delimiting radially therebetween a conduit for flowing a first fluid intended to form a secondary flow, the heat exchanger comprising an outer cowl and a transfer module, the transfer module including a circuit for circulating a second fluid, the heat exchanger being connected to one of the internal structure and the external structure so as to be able to transmit heat from the second fluid to the first fluid, the nacelle comprising an actuator configured to displace the outer cowl and the transfer module of the heat exchanger between:

a retracted position in which the transfer module is received in a housing of the internal or external structure to which the heat exchanger is connected and in which the outer cowl seals an opening of the housing so as to reconstitute a delimiting surface of the flow conduit, a deployed position in which the transfer module extends into the flow conduit so as to be able to be crossed by a fraction of the secondary flow and thus transmit heat from the second fluid to the first fluid, the heat exchanger comprising an inner wall, the transfer module extending radially between the inner wall and the outer cowl, the inner wall of the heat exchanger being configured to seal said opening of the housing of the internal or external structure to which the heat exchanger is connected so as to reconstitute said delimiting surface of the flow conduit when the heat exchanger is in the deployed position.

2. The nacelle according to claim 1, wherein the actuator is configured to move the outer cowl and the transfer module of the heat exchanger between the retracted position and the deployed position by radial translation.

3. The nacelle according to claim 1, wherein the outer cowl of the heat exchanger comprises a surface having, in a median longitudinal plane, a single or double curvature.

4. The nacelle according to claim 1, wherein the heat exchanger comprises a coupling member for coupling the circuit for circulating the second fluid to a lubrication circuit of the propulsion assembly.

5. The nacelle according to claim 1, comprising a detection or evaluation member for detecting and/or evaluating at least one parameter such as the temperature of the second fluid, and a control module connected, on the one hand, to the detection or evaluation member and, on the other hand, to the actuator so as to be able to displace the outer cowl and the transfer module depending on the at least one parameter.

6. A propulsion assembly for an aircraft, the propulsion assembly comprising a nacelle according to claim 1.

7. A method for manufacturing a nacelle according to claim 1, the method comprising a step of additive manufacturing of the outer cowl of the heat exchanger.

8. A method for manufacturing a nacelle according to claim 1, the method comprising a step of additive manufacturing of the inner wall of the heat exchanger.

\* \* \* \* \*